United States Patent [19]
Barber et al.

[11] 4,052,750
[45] Oct. 4, 1977

[54] FLEXIBLE RECORDING DISK WITH IMPROVED SPINDLE MOUNTING MEANS

[75] Inventors: John A. Barber; C. Norman Dion; Richard N. James, all of San Jose, Calif.

[73] Assignee: Dysan Corporation, Santa Clara, Calif.

[21] Appl. No.: 637,915

[22] Filed: Dec. 5, 1975

[51] Int. Cl.² ............... G11B 5/82; B65D 85/02; G11B 5/016; H05F 3/00
[52] U.S. Cl. ............................. 360/135; 206/444; 360/99; 361/212
[58] Field of Search .................... 360/135, 99, 97, 98, 360/86; 206/444; 361/212; 274/47

[56] References Cited
U.S. PATENT DOCUMENTS

| | | | |
|---|---|---|---|
| 3,729,720 | 4/1973 | Darling et al. | 360/99 |
| 3,836,731 | 9/1974 | Wilisch et al. | 360/135 |
| 3,951,264 | 4/1976 | Heidecker et al. | 360/135 |

*Primary Examiner*—Daryl W. Cook
*Attorney, Agent, or Firm*—Townsend and Townsend

[57] ABSTRACT

An improved flexible magnetic recording disc assembly comprising an envelope and a flexible recording disc rotatably received in the envelope, the disc having an annular reinforcement member concentrically arranged adjacent the central mounting aperture of the disc. Two embodiments are disclosed: a first having a single annular reinforcement member secured to the spindle side of the flexible disc; and a second having a pair of annular reinforcement members disposed on opposite surfaces of the disc. The reinforcement member has an axial thickness in the range from about 2 to about 7 mils to provide sufficient structural rigidity to resist crinkling and flaring during use; a static and dynamic coefficient of friction not less than about 0.3, and a total electrical resistance measured in the longitudinal axial direction in the range of about 1 ohm to about 50 megohms to facilitate dissipation of static electrical charges which may build up on the recording surfaces of the disc. The reinforcement member is adhered to the flexible disc by means of a cement which is preferably electrically conductive, also to promote static charge dissipation.

13 Claims, 4 Drawing Figures

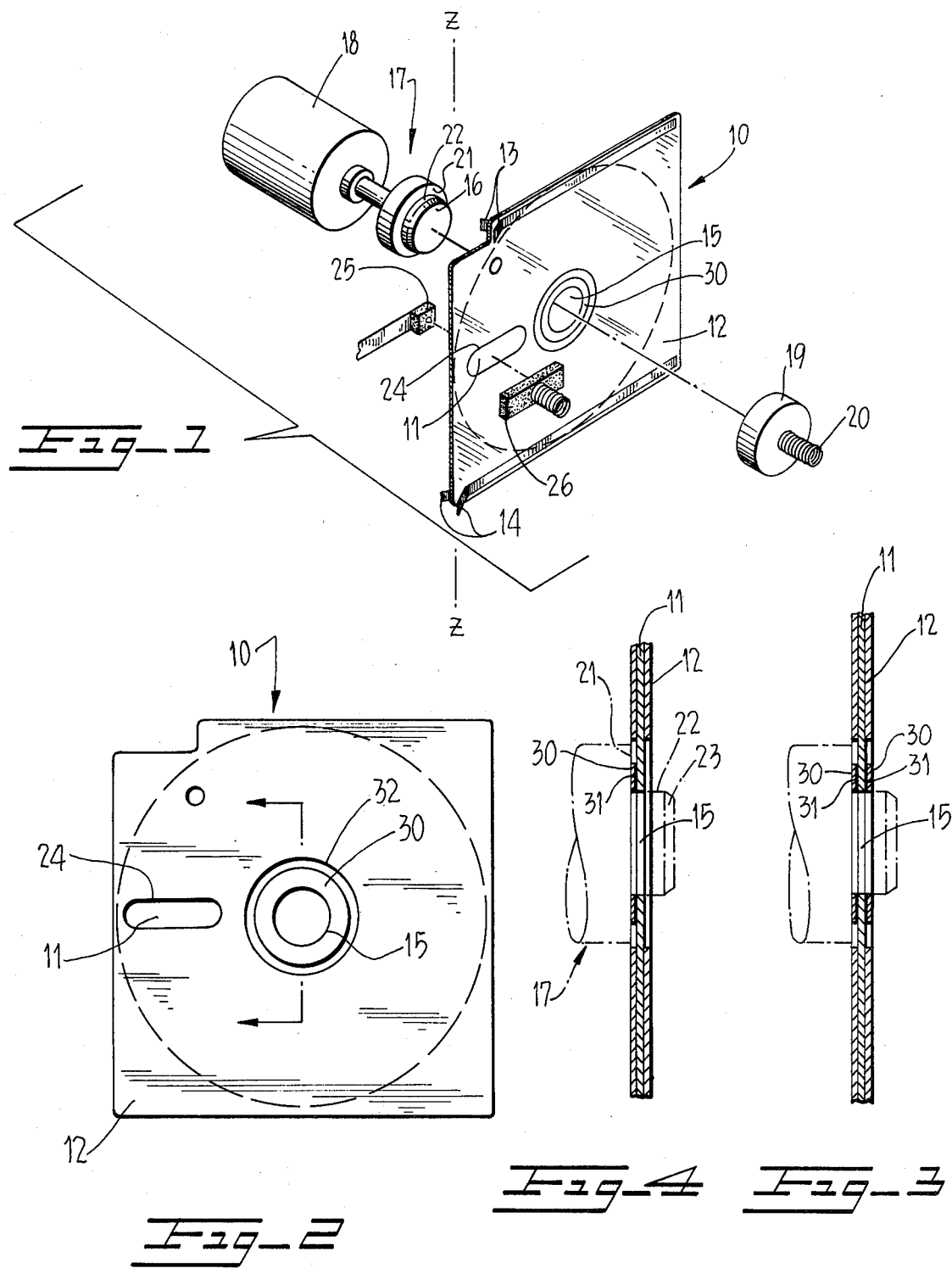

FLEXIBLE RECORDING DISK WITH IMPROVED SPINDLE MOUNTING MEANS

BACKGROUND OF THE INVENTION

This invention relates to the field of magnetic recording. More particularly, this invention relates to an improved flexible recording disk of the type used in digital data storage units and the method of manufacturing same.

In the field of digital data processing, flexible recording discs find increasing use as a data storage medium. Such discs are designed for use with flexible disc drives and are fabricated typically from a thin sheet of Mylar or a similar substance to a thickness of about three thousandths of an inch and provided with a magnetic oxide recording coating on one or both sides. The disc has an annular shape with a central mounting aperture similar to that of a 45 rpm phonograph record. The disc is rotatably received in a protective jacket having a first aperture generally aligned with an indexing hole in the disc body and an oblong radially extending aperture for exposing the surface of the disc on which the data tracks are recorded.

Flexible discs are used in conjunction with flexible disc drive units having an entrance slot by which the disc may be inserted and removed from the drive unit, and a drive mechanism for rotating the jacketed disc at a substantially constant high operating speed. The drive unit typically includes a rotatable spindle having a substantially cylindrical main body portion and a tapered free end to assist in locating the disc mounting aperture about the spindle during loading. A retractable annular rotatable clamp or clutch positioned generally opposite the free end of the driving spindle cooperates with the spindle to align and hold the disc during rotation.

In use, the jacketed disc is inserted into the entrance slot with the clamp retracted away from the free end of the spindle in order to provide sufficient clearance to enable insertion of the disc and jacket until the rear edge of the jacket registers in the home position in the slot. Thereafter, the clamp is released to press the disc onto the spindle in positive engagement so that the disc may be quickly brought up to operating speed.

Since the drive spindle is rotating either constantly or at an accelerating rate prior to loading of the disc, when the stationary disc is translated onto the spindle by the clamp during each loading there is a sudden acceleration force experienced by the central region of the disc adjacent the mounting aperture. This sudden acceleration causes the inside diameter of the disc to be damaged during each load, which damage is exhibited both by a removal of portions of the oxide recording coating from the Mylar substrate along the inside diameter of the disc and by a flaring or crinkling of the Mylar material along the inside diameter thereof. This damage is compounded by the fact that the flexible disc is frequently slightly off center with respect to the spindle. Additional oxide recording coating removal is caused due to the fact that the disc initially slips with respect to the spindle upon insertion. While typically minor for a single given loading of the disc, this damage is cumulative so that after several cycles of operation the central mounting aperture becomes eccentric. This causes the ideally concentrically arranged data tracks to be misaligned with the recording head. Due to the close tolerances involved (approximately 50 tracks per inch radially, minimum track bit density of between 4,000 to 5,000 bits per inch, data track width of approximately 20.8 mils, gap length of write transducer about 6 mils, radial track tolerance of ±7.4 mils), reading errors arise with previously written data on the disc surface, since such recorded data tracks are substantially concentric with the mounting aperture. In addition, when data is recorded on a damaged disc having an eccentric central aperture, the resulting data tracks are typically noncircular which gives rise to reading errors during subsequent use of the disc.

The oxide recording surface removal noted above causes additional complications in the operation of a flexible disc unit. Flaked off oxide particles may relocate to other portions of the flexible disc surface, thereby producing an agglomerate which can adhere to the surface of the magnetic read/write transducer of the associated disc drive unit. Thereafter, as the read/write transducer is translated radially of the rotating disc the smoothly burnished recording surface is gouged by the adhered agglomerate which destroys the functional operability of the entire disc. In addition, the flaked off magnetic oxide particles may also fall into other elements of the control unit and adversely affect their operation.

SUMMARY OF THE INVENTION

The invention comprises an improved flexible recording disc having an annular reinforcement means concentrically arranged adjacent the central mounting aperture on at least one side of the flexible disc. Two embodiments are disclosed: a first in which a single annular reinforcement means is secured on the spindle side of the flexible disc; and a second employing a pair of annular reinforcement means disposed on opposite surfaces of the flexible recording disc. In both embodiments, the reinforcement means is fabricated to an axial thickness in a predetermined range of about 2 to about 7 mils thickness in order to provide the desired structural rigidity to the assembly. Further, the reinforcement means is fabricated from materials having predetermined frictional and electrical characteristics. The frictional characteristics are selected to provide sufficient friction to enable the disc to be grasped by the rotating spindle in such a manner that a constant operating speed can be maintained. The electrical characteristics provide sufficient conductivity so that static electricity which builds up on the recording surfaces of the flexible disc is dissipated readily to ground to prevent electrical interference during writing or reading of data. The reinforcement means is also secured or adhered to the flexible disc by means of a cement which is preferably electrically conductive to promote static charge dissipation.

The method of fabricating the invention proceeds by forming one or more annular reinforcement members with a suitable punching die, applying an adhesive coating to one side thereof, and pressure adhering the reinforcement means directly to the flexible disc. This last step may be performed before or after the disc is mounted in its protective jacket. Alternatively, non-apertured reinforcement blank members are first applied to a flexible disc blank, after which the central aperture is punched out with a suitable punching tool. This method assures uniform registration of the central disc aperture with the aperture in the reinforcement member. After punching, the blank with the attached reinforcement member are inserted into the protective jacket.

For a fuller understanding of the nature and advantages of this invention, reference should be had to the ensuing detailed description taken in conjunction with the accompanying drawings.

BRIEF DESCRIPTION OF THE DRAWINGS

FIG. 1 is a schematic perspective view illustrating a flexible disc fabricated according to the teachings of the invention and the key elements of the drive unit;

FIG. 2 is a side elevational view of the flexible disc of FIG. 1;

FIGS. 3 and 4 are sectional views taken after lines 3, 4 of FIG. 2 also showing a portion of a driving spindle.

DESCRIPTION OF THE PREFERRED EMBODIMENTS

Figure 5:
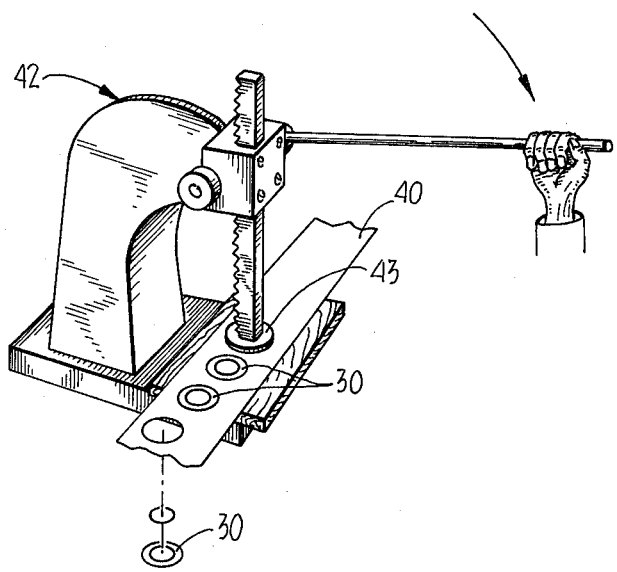
FIG. 5 is an illustrative view of the blanking operation for the annular reinforcement members.

Turning now to the drawings, FIG. 1 is a schematic perspective view illustrating the invention. A flexible recording disc assembly generally designated by reference numeral 10 and comprising an inner annular recording member 11 encased in a protective jacket 12 is frictionally received in upper and lower guide element pairs 13, 14 of a flexible disc file unit, such as a Memorex Model 652 Flexible Disc File. Since such units are known and commercially available, detailed description of the structural elements thereof is omitted to avoid prolixity, and those elements necessary to an understanding of the invention are depicted schematically. Guide elements pairs 13, 14 are mounted for pivoting motion about the Z axis shown in FIG. 1.

Flexible disc assembly 10 has a central mounting aperture 15 of sufficient radial dimension to accommodate the driving end 16 of a rotatable spindle 17 powered by an electric motor 18. A cylindrical clutch or clamp member 19 rotatably mounted (by elements not shown) is biased by means of a spring 20 in the direction of spindle 17 and serves to urge flexible disc assembly 10 onto spindle 17 so that central aperture 15 is snugly received over cylindrical bearing surface portion 21 with the reverse surface of member 11 flush against surface 22 of spindle 17. As best seen in FIGS. 3 and 4, spindle 17 is provided with an end taper 23 to facilitate loading of disc 10.

An oblong aperture 24 is provided in envelope or jacket 12 on both sides thereof to expose the recording surface of flexible disc portion 11 to a conventional read/write transducer 25 and a spring biased pressure pad 26.

In use, spindle 17 is rotated at a substantially constant relatively high speed (e.g. 375 rpm). To read or write data, a flexible disc assembly 10 is next inserted into the flexible disc drive unit by pivoting guide pairs 13, 14 about the Z axis in a direction away from spindle 17 in order to provide sufficient clearance for the unobstructed insertion of flexible disc assembly 10. Thereafter, guide pairs 13, 14 are pivoted about the Z axis in the opposite direction so that central aperture 15 of flexible disc assembly 10 is pressed onto spindle 17 by clutch member 19. As tapered portion 16 of spindle 17 progressively extends into central aperture 15, disc 11 is suddenly subjected to the rotary force provided by frictional contact between surface 21 and portions of the surface of tapered portion 16. Once disc 11 has been brought up to operating speed (typically within a period of 0.5 second), transducer 25 may be electrically operated to either write data onto the recording surface or read data previously recorded on the recording surface. Removal of flexible disc assembly 10 proceeds in the opposite manner from that already described.

In order to protect the critical central aperture area or region of disc 11, an annular reinforcement member 30 is secured thereto by means of a suitable adhesive 31 having the characteristics described below. Reinforcement member 30 is concentrically mounted relative to central aperture 15, and is fabricated from a material having the characteristics specified below. Disc 11 may be provided with a pair of reinforcement members 30 as shown in FIG. 3 or, alternatively, with a single reinforcement member 30 as shown in FIG. 4. In the latter case, reinforcement member 30 is adhered to disc 11 on the side facing spindle 17 for best results.

Figure 6:
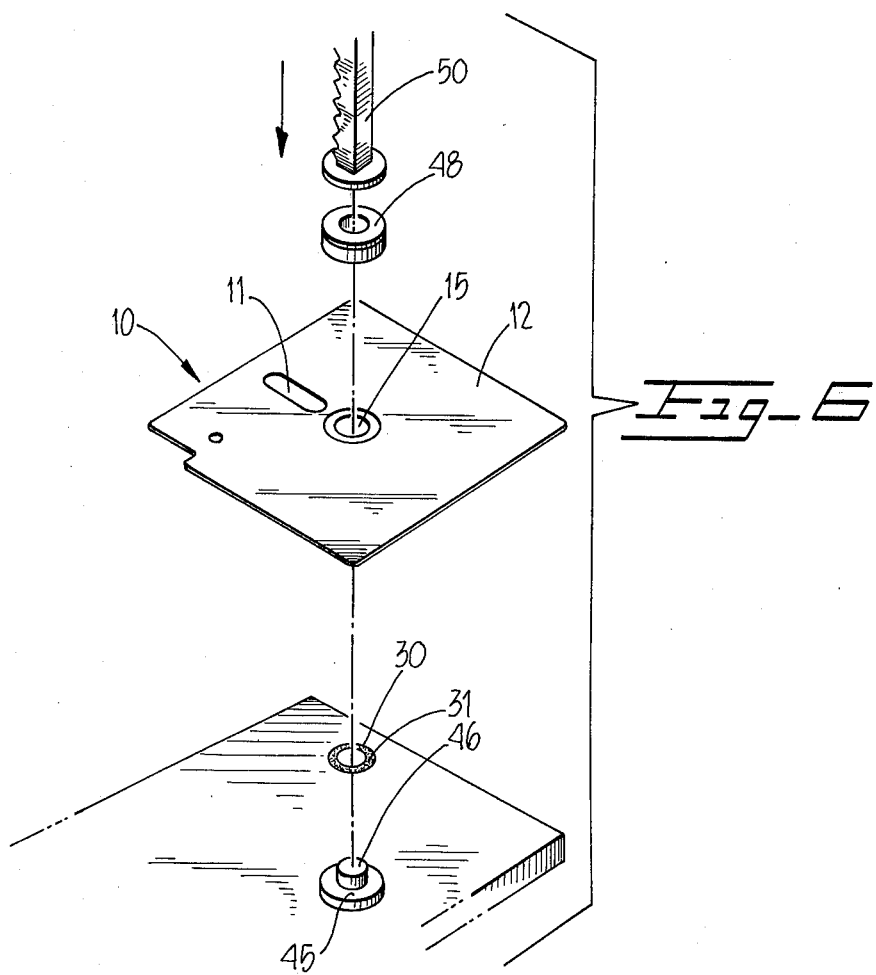
FIG. 6 is an illustrative view of the adhering operation.

FIGS. 5 and 6 illustrate a first method of fabricating a flexible disc assembly according to the invention. With reference to FIG. 5, annular reinforcement members 30 are first prepared by punching individual members 30 from suitable sheet stock 40 using a conventional fixture 42 provided with a suitable annular die 43. Sheet stock 40 may be supplied with adhesive layer 31 coated on the bottom side thereof and covered with a removable thin protective layer of non-adhesive material, e.g. wax paper or the like; alternatively, the adhesive may be applied to the individual members 30 after the punching operation and prior to adhesion to disc 11.

With reference to FIG. 6, the individual members 30 are next arranged, one at a time, on a suitable fixture 45 with adhesive layer 31 facing upwardly, flexible disc assembly 10 is next arranged over member 30 with central aperture 15 received in boss 46 of fixture 45 and the annular region surrounding aperture 15 is pressed against member 30 by means of a cylindrical or annular mating fixture 48 and a force translating mechanism 50 of any convenient or conventional type. It should be noted that member 30 may be adhered to disc 11 either before or after disc 11 is placed in jacket 12.

Variations of the above-noted method of fabrication will readily occur to those skilled in the art. For example, if desired, members 30 may be formed initially in a circular shape by punching from sheet stock 40 and pressure adhered to the central portion of disc 11 prior to punching aperture 15 in the latter element. Thereafter, aperture 15 may be punched to remove the central portion of both disk 11 and member 30.

Critical to the performance of the invention is the material from which reinforcement member 30 is fabricated and the nature of the adhesive cement. Member 30 must possess sufficient rigidity to be highly resistant to crinkling or flaring under usual operation conditions. Annular disks having an axial thickness in the range from about two to about seven mils provide the required structural rigidity. Member 30 must also be fabricated from a material having a static and dynamic (sliding) coefficient of friction not less than about 0.3. This material must further possess an electrical resistance in the range from about 1 ohm to about 50 megohms, measured across the axial thickness thereof. Since the total axial resistance of member 30 is dependent not only on the resistivity of the material but also on the total volume thereof, materials having different resistivities may be employed by simply changing the radial dimensions of member 30 within the limits defined by the diameter of aperture 32 in jacket 12 and the minimum diameter of central aperture 15. This latter dimension is typically equal to the radius of portion 22 of spindle 17 within a tolerance of +0.010 inch and −0.000. Suitable materials for the fabrication of member 30 are calendared paper stock coated with a mixture of calcium carbonate, clay and starch. Carbon may also be added to the mixture to provide the electrical characteristics noted above.

The adhesive cement used to adhere member 30 to disc 11 may comprise any one of a number of rubber-based or synthetic formulations generally referred to as pressure sensitive adhesives, and of a permanent type, i.e. not readily removable. The adhesive cement should preferably exhibit low electrical resistance to the flow of electrical changes from the surface of disc 11 to annular member 30, and thence to spindle 17. Such low electrical resistance may be imparted to adhesive 30 by adding carbon or finely divided particles of a good electrically conductive material (e.g. brass, steel, copper, etc.) to the adhesive compounds noted above.

In use, reinforcement member 30 protects the fragile delicate central region of disc 11 adjacent central mounting aperture 15 from both lateral and transverse deformation when loading and unloading the flexible disc assembly 10. Since member 30 covers the recording surface layer where adhered to disc 11, slippage between spindle 17 and disk 11 does not result in flaking off of the usual iron oxide particles. It has been found that the useful lifetime of flexible disc fabricated in accordance with the teachings of the invention exceeds conventional flexible discs by at least 2 orders of magnitude (or 500 hours of operation).

While the above provides a full and complete disclosure of the preferred embodiments of the invention, various modifications, alternate constructions and equivalents may be employed without departing from the true spirit and scope of the invention. Therefore the above description and illustrations should not be construed as limiting the scope of the invention which is defined by the appended claims.

What is claimed is:

1. In a flexible disc assembly comprising a flexible disc having a pliant substrate and at least one recording layer on said substrate, said disc having a central aperture adapted to receive a rotatable drive spindle, and a jacket substantially enclosing said flexible disc and permitting rotation of said flexible disc therewithin, the improvement comprising reinforcement means adhered to at least one surface of said disc adjacent said central aperture for preventing deformation of said disk in the region of said central aperture and for protecting said recording layer, said reinforcement means being fabricated from a material having sufficient electrical conductivity to prevent accumulation of electrical charges on said disc.

2. The apparatus of claim 1 wherein said reinforcement means has a total electrical resistance in the range from about 1 ohm to about 50 megohms.

3. The apparatus of claim 1 wherein said reinforcement means is fabricated from a material having sufficient frictional resistance to enable said disk to be rotated by said rotatable drive spindle.

4. The apparatus of claim 3 wherein said material has a static coefficient of friction not less than about 0.3.

5. The apparatus of claim 3 wherein said material has a coefficient of sliding friction not less than about 0.3.

6. The apparatus of claim 1 wherein said reinforcement means comprises an annular member arranged substantially concentrically with said central aperture and an adhesive compound for adhering said annular member to said disc in said region.

7. The apparatus of claim 6 wherein said adhesive compound is electrically conductive.

8. The apparatus of claim 1 wherein said reinforcement means comprises a pair of annular members each arranged substantially concentrically with said central aperture on opposite surfaces of said disc.

9. A method of fabricating an improved flexible recording disc assembly of the type comprising a flexible disc having a pliant substrate and at least one recording layer on said substrate, said disk having a central aperture adapted to receive a rotatable drive spindle and a jacket substantially enclosing said flexible disc and permitting rotation of said flexible disk therewith, said method comprising the steps of:
  a. providing a reinforcement member having sufficient electrical conductivity to prevent accumulation of electrical charges on said disc when adhered thereto and predetermined frictional resistance characteristics; and
  b. adhering said reinforcement member to a surface of said disc adjacent said central aperture.

10. The method of claim 9 wherein said reinforcement member has an annular configuration, and said step (b) of adhering includes the step of arranging said annular reinforcement member substantially concentrically of said central aperture.

11. The method of claim 9 wherein said step (b) of adhering includes the steps of providing an adhesive compound and pressing said reinforcement member and said disk together with said adhesive compound therebetween.

12. The method of claim 11 wherein said adhesive compound is electrically conductive.

13. The method of claim 9 wherein said step (a) of providing includes the step of providing a pair of said reinforcement members, and said step (b) of adhering includes the step of adhering said pair of reinforcement members to opposed surfaces of said disc adjacent said central aperture.

* * * * *